United States Patent
Wu

(10) Patent No.: US 9,897,426 B2
(45) Date of Patent: Feb. 20, 2018

(54) MEASURING TOOL FOR DISC BRAKE DEVICE BRAKE PAD

(71) Applicant: Pi-Liang Wu, Taichung (TW)

(72) Inventor: Pi-Liang Wu, Taichung (TW)

( * ) Notice: Subject to any disclaimer, the term of this patent is extended or adjusted under 35 U.S.C. 154(b) by 130 days.

(21) Appl. No.: 15/132,257

(22) Filed: Apr. 19, 2016

(65) Prior Publication Data

US 2017/0108323 A1 Apr. 20, 2017

(30) Foreign Application Priority Data

Oct. 15, 2015 (TW) ............................. 104133940 A

(51) Int. Cl.
*G01B 5/14* (2006.01)
*G01B 3/20* (2006.01)
*G01B 5/00* (2006.01)

(52) U.S. Cl.
CPC ............. *G01B 3/20* (2013.01); *G01B 5/0028* (2013.01); *G01B 5/14* (2013.01)

(58) Field of Classification Search
CPC ................................. G01B 5/0028; G01B 5/14
USPC ............................ 33/609, 610, 783, 832, 833
See application file for complete search history.

(56) References Cited

U.S. PATENT DOCUMENTS

| | | | | |
|---|---|---|---|---|
| 3,845,564 A * | 11/1974 | Morgan | .................... | G01B 3/18 33/816 |
| 3,854,216 A * | 12/1974 | Mosher | .................... | G01B 5/06 33/609 |
| 6,237,723 B1 * | 5/2001 | Salsman | .................. | F16D 66/00 188/1.11 W |
| 6,931,744 B1 * | 8/2005 | Ikerd, Jr. | ............. | F16D 65/0043 33/501.45 |
| 7,040,151 B2 * | 5/2006 | Graham | ................ | G01B 5/0028 33/600 |
| 2005/0066535 A1 * | 3/2005 | Rupp | .................... | A61B 5/1072 33/512 |
| 2010/0031523 A1 * | 2/2010 | Clark | ........................ | G01B 3/20 33/610 |
| 2014/0007445 A1 * | 1/2014 | Yang | ......................... | G01B 3/20 33/811 |
| 2016/0084626 A1 * | 3/2016 | Reble | .................... | G01B 5/0028 33/609 |
| 2016/0084627 A1 * | 3/2016 | Reble | ....................... | G01B 3/30 33/609 |

(Continued)

*Primary Examiner* — G. Bradley Bennett

(57) ABSTRACT

A measuring tool for disc brake device brake pad, which includes a base, a first tube, a second tube, a front rod, a measuring rod, and a spring, wherein the first tube is configured at the front end of the base, the first tube is perforated with a sighthole. The second tube is pivoted in the first tube, and a marking is formed on the exterior of the midsection of the second tube. The front rod is configured at the front end of the second tube, and a pivot hole axially penetrates the front end of the front rod. The measuring rod pivotal penetrates the front rod, the second tube, and the first tube. The rear end of the measuring rod is inserted into the center of the front end of the base. A contact pin extends in a curved sideward direction from the front end of the measuring rod, and the contact pin abut against the front end of a protruding portion. The spring is disposed in the interior of the second tube, and the two ends of the spring respectively abut against the front rod and the base.

4 Claims, 5 Drawing Sheets

(56) References Cited

U.S. PATENT DOCUMENTS

2016/0377407 A1* 12/2016 Herrmann .............. G01B 21/26
33/203

* cited by examiner

MEASURING TOOL FOR DISC BRAKE DEVICE BRAKE PAD

BACKGROUND OF THE INVENTION (a) Field of the Invention

The present invention relates to a tool used when servicing a motor vehicle disc brake device, and more particularly to a measuring tool for disc brake device brake pad, wherein the measuring tool in question is used to measure the distance between the brake pad and the brake disc.

(b) Description of the Prior Art

A motor vehicle disc brake device is mounted on the wheel axle of a motor vehicle so as to be adjacent to the wheel, and the disc brake device is used to cause the motor vehicle to slow down and brake.

The disc brake device primarily uses a pair of mutually corresponding brake pads respectively mounted on the two sides of a brake disc. The brake disc is connected to the wheel axle of the motor vehicle and rotates in synchronicity with the wheel axle. Each of the brake pads is adjacent to the respective surface of the brake disc, and is provided with a friction block. When each of the brake pads clamps the respective surface of the brake disc, each of the friction blocks contacts the respective side surface of the brake disc. The corresponding friction between each of the friction blocks and the brake disc is used to reduce the rotational speed of the wheel axle, thereby achieving the objective of slowing down and braking the motor vehicle. However, the contact friction between the friction blocks and the brake disc causes wear and tear of the friction blocks, resulting in a gradual decrease in the thickness of the friction blocks. When the thickness of the friction blocks has decreased to being equal to or less than a preset safety value, then neglecting to replace the brake pads will bring about a reduction in the effectiveness of slowing down and braking the vehicle, and thereby endangering driving safety.

The distance between the mutually adjacent surfaces of the brake pads and the brake disc can serve as a basis to determine the thickness of the friction blocks, and accordingly decide whether or not to replace the brake pads.

To measure the distance between the brake pads and the brake disc, the wheel needs to be detached from the wheel axle to expose the disc brake device, then a thickness/gap gauge is used to measure the distance between the brake pads and the brake disc. Hence, such a measuring method requires detaching the wheel, which is time consuming and complicated.

SUMMARY OF THE INVENTION

The main object of the present invention lies in providing a measuring tool for disc brake device brake pad, which enables the measuring tool in question to be used to measure the distance between a brake pad and a brake disc without the need to detach the respective wheel.

To achieve the object of the present invention, the present invention relates a measuring tool for disc brake device brake pad, including a base, a first tube, a second tube, a front rod, a measuring rod, and a spring; wherein the base is a round cylindrical body, and a retaining screw is radially screwed into the circumference of the base; the first tube is a round tube configured at the front end of the base, and the rear end of the first tube is connected to the front end of the base, a long sighthole is perforated in the tube wall of the first tube, and the two ends of the long sighthole are respectively oriented toward the two ends of the first tube, a ruler is formed at one side of the sighthole on the exterior of the first tube, the ruler is composed of an array of calibrations and numbers, which are used to display length measurements; the second tube is a round tube pivoted in the first tube so that the rear end of the second tube is positioned in the interior of the first tube, thereby enabling the first tube to displace back and forth along the axial direction thereof on the exterior of the second tube, a circular marking encircles and is formed on the external circumference of the second tube at a midsection thereof, and the marking is positioned between the two ends of the sighthole; the front rod is configured to the rod body at the front end of the second tube, the front end of the front rod is positioned exterior of the front end of the first tube, and the rear end of the front rod is inserted into the second tube, a pivot hole axially penetrates the front rod, and a protruding portion protrudes from the front end of the front rod, a guide groove is indented in the top edge of the protruding portion, and the guide groove affords passage to the pivot hole, two limiting surfaces are formed on the two sides of the guide groove at the front end of the protruding portion, an abutting portion protrudes from the front end of the protruding portion of the front rod, and the abutting portion is used to sideward abut against the side surface of a brake disc of a disc brake device, an abutting surface is further formed on the front end of the abutting portion; the measuring rod is a long round rod, and the measuring rod pivotal penetrates the guide groove and the pivot hole of the front rod, as well as the second tube and the first tube, the rear end of the measuring rod is inserted into the center of the front end of the base, and one end of the retaining screw abuts against and retains one side of the measuring rod, thereby enabling the base to connectedly drive the measuring rod and synchronously rotate and effect linear reposition displacement thereof, the front end of the measuring rod extends in a curved sideward direction to form a contact pin, and the contact pin abuts against any one of the two limiting surfaces, the maximum external diameter of the contact pin is less than the distance between the limiting surfaces and the abutting surface; the spring is a helical spring disposed in the interior of the second tube, the front end of the spring abuts against the rear end of the front rod, and the rear end of the spring abuts against the front end of the base, in addition, the measuring rod penetrates the spring, and the spring is subjected to corresponding compression from the base and the front rod, accordingly, the spring is able to respectively apply an abutting force on the base and the front rod.

Preferably, the marking is a narrow groove formed by an indentation on the external surface of the second tube.

Preferably, the periphery close to the front end of the base is indented with an annular inserting groove, an elastic retaining ring is embedded into the inserting groove of the base, the internal tube wall close to the rear end of the first tube is indented with an annular groove, and the annular groove enables the periphery of the retaining ring to embed thereinto, thereby enabling the base to pin connect to the first tube.

Preferably, a screw hole is formed in the center of the front end of the base, and the rear end of the measuring rod screws into the screw hole.

Accordingly, using the aforementioned measuring tool for disc brake device brake pad, there is no need to detach the wheel while still being able to easily and quickly measure the distance between a brake pad and a brake disc.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
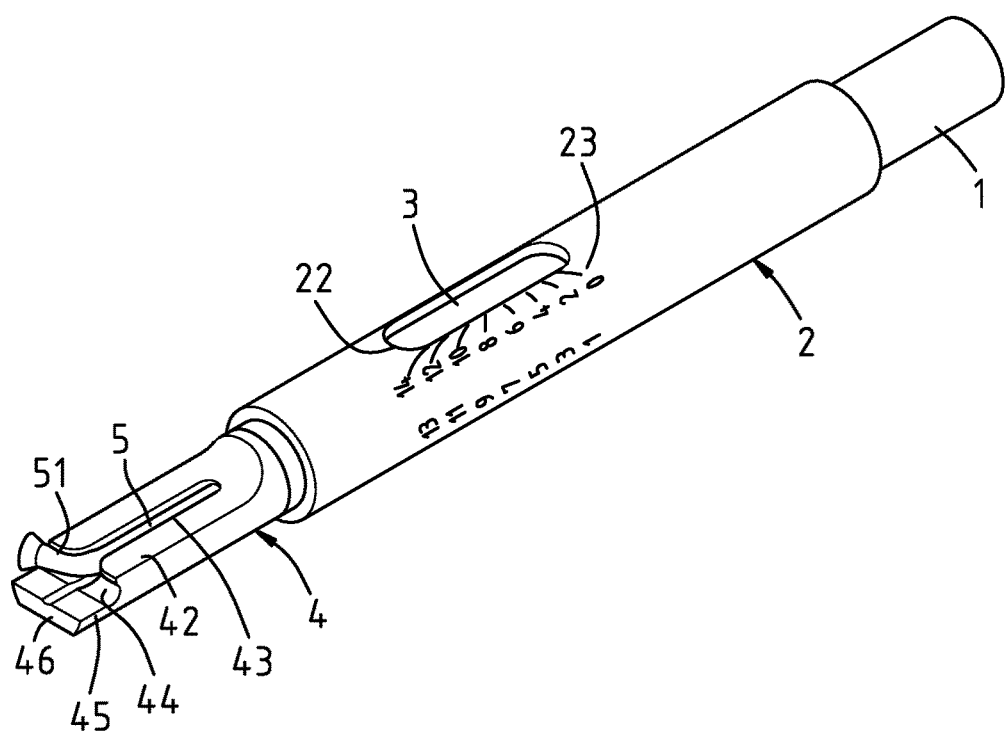
FIG. 1 is an elevational view of an embodiment of the present invention.
Figure 2:
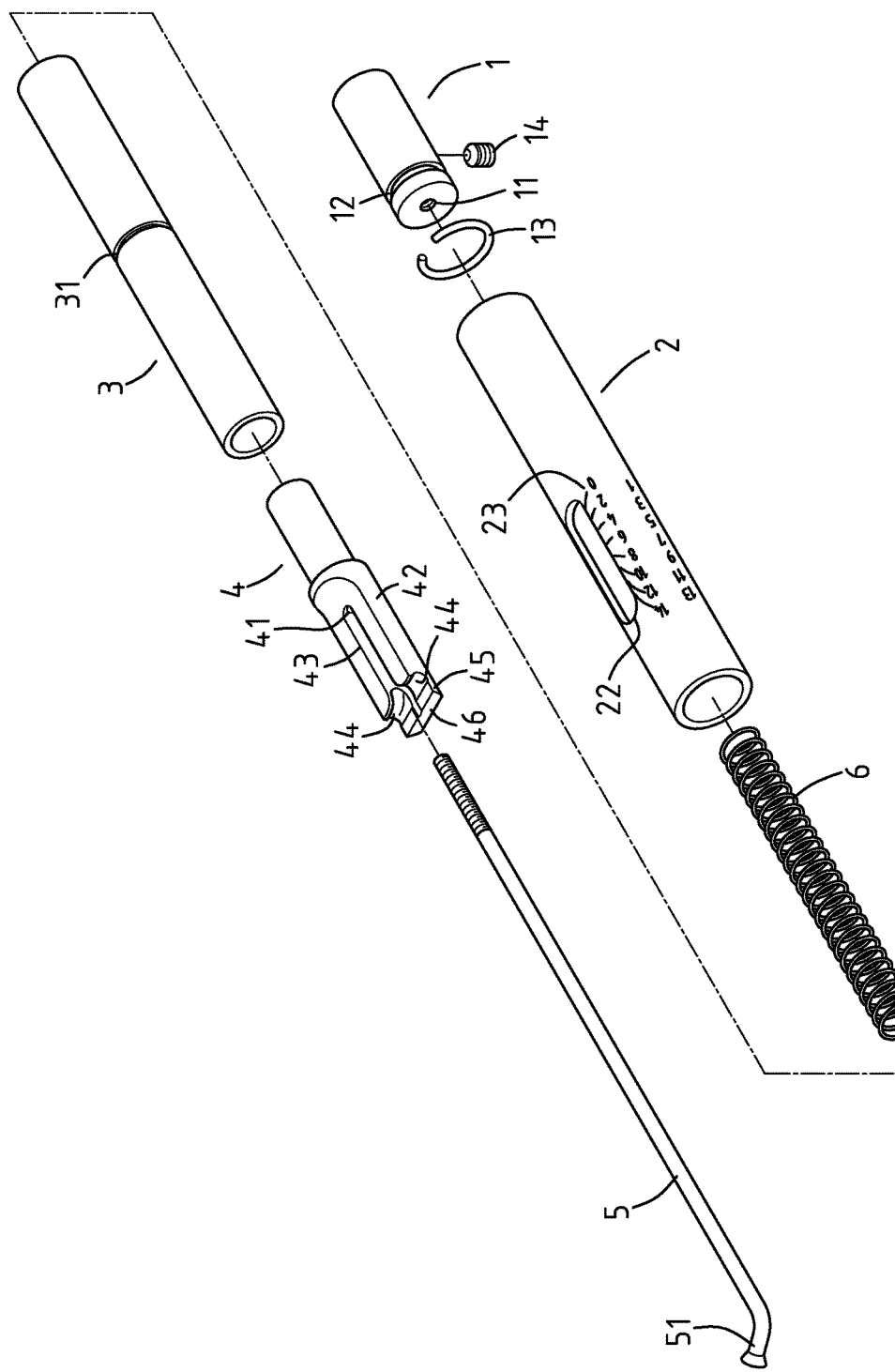
FIG. 2 is an exploded elevational view of the embodiment of the present invention.
Figure 3:
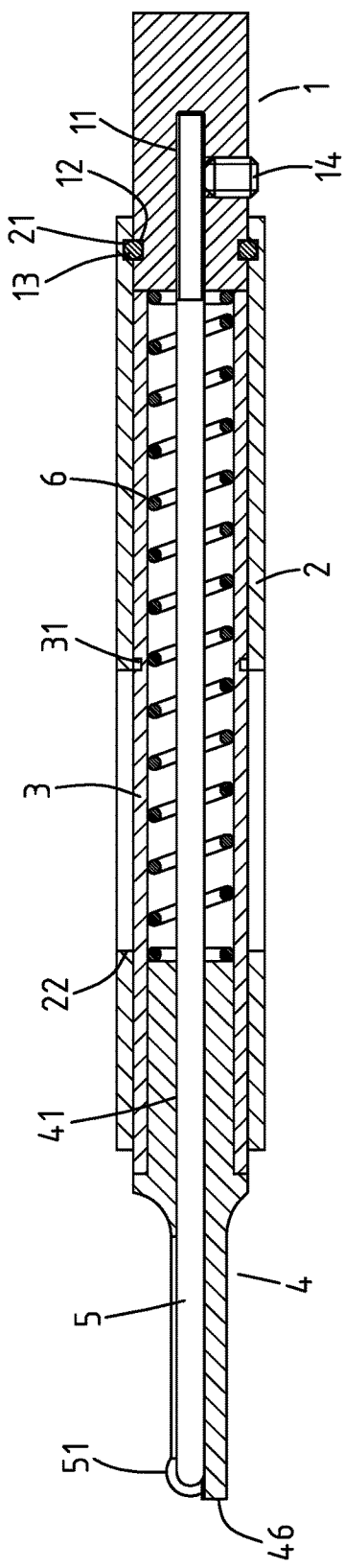
FIG. 3 is a cross-sectional view in an axial direction of the embodiment of the present invention.
Figure 4:
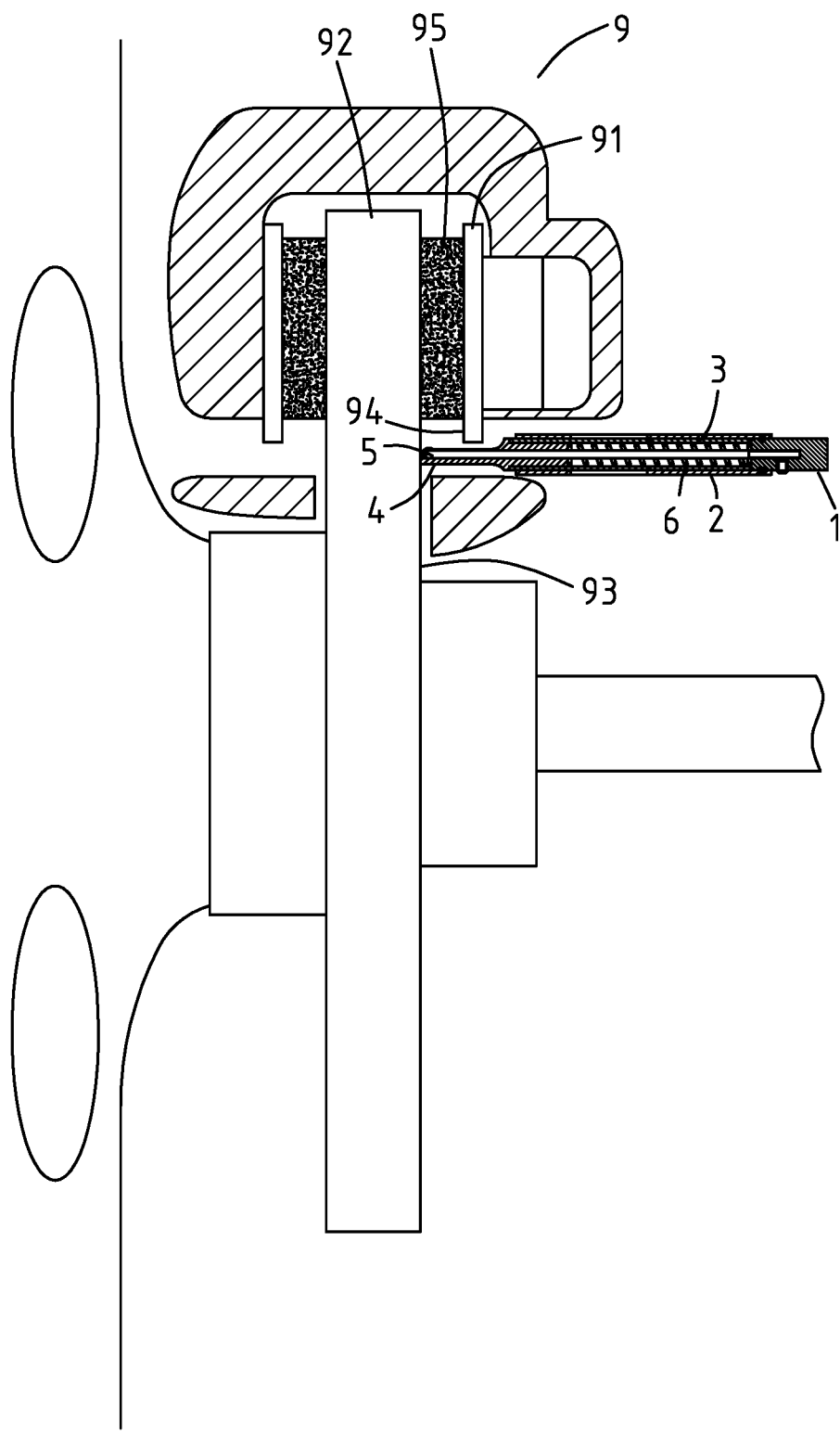
FIG. 4 is a schematic view (1) depicting the embodiment of the present invention in use.
Figure 5:
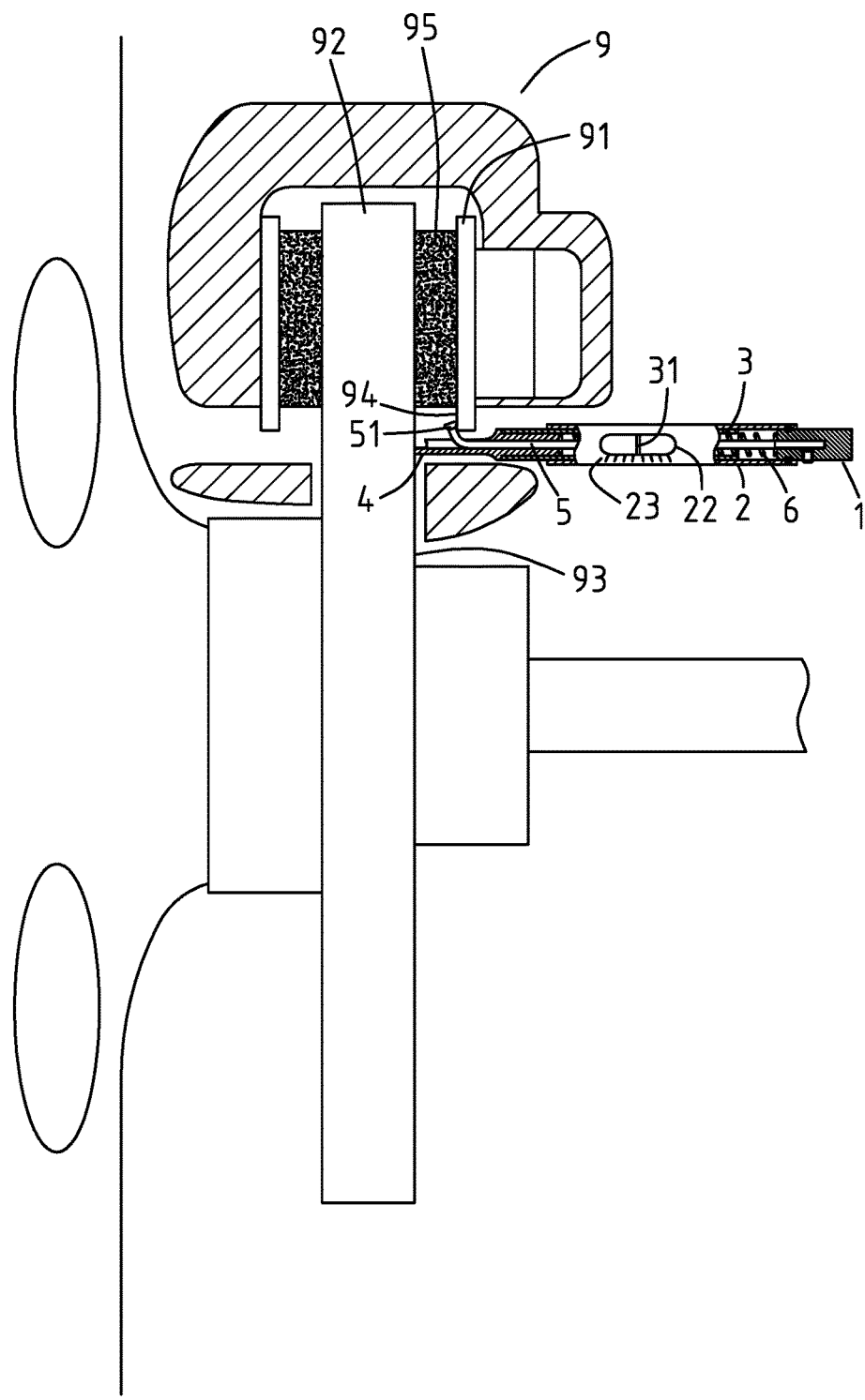
FIG. 5 is a schematic view (2) depicting the embodiment of the present invention in use.

Referring to FIGS. 1 to 3, which show an embodiment of a measuring tool for disc brake device brake pad of the present invention, including a base (1), a first tube (2), a second tube (3), a front rod (4), a measuring rod (5), and a spring (6), wherein:

The base (1) is a round cylindrical body, and a screw hole (11) is formed in the center of the front end of the base (1). The periphery close to the front end of the base (1) is indented with an annular inserting groove (12), and an elastic retaining ring (13) is embedded into the inserting groove (12) of the base (1). A retaining screw (14) is radially screwed into the circumference of the base (1).

The first tube (2) is a round tube configured at the front end of the base (1), and the rear end of the first tube (2) is connected to the front end of the base (1). The internal tube wall close to the rear end of the first tube (2) is indented with an annular groove (21), which enables the periphery of the retaining ring (13) to embed into the annular groove (21), thereby enabling the base (1) to pin connect to the first tube (2). Using the retaining ring (13) to retain the base (1) makes it impossible for corresponding displacement of the first tube (2) along the direction of the long axis thereof. A long sighthole (22) is perforated in the tube wall of the first tube (2), and the two ends of the long sighthole (22) are respectively oriented toward the two ends of the first tube (2). A ruler (23) is formed at one side of the sighthole (22) on the external surface of the first tube (2), and the ruler (23) is composed of an array of calibrations and numbers. The ruler (23) is formed using an embossing method, and is used to display length measurements. The embossing method used to form the ruler (23) can be replaced by an etching or engraving method to form the indented composition of the ruler (23).

The second tube (3) is a round tube pivoted in the first tube (2) so that the rear end of the second tube (3) is positioned in the interior of the first tube (2), thereby enabling the first tube (2) to displace back and forth along the axial direction thereof on the exterior of the second tube (3). A circular marking (31) encircles and is formed on the external circumference of the second tube (3) at a midsection thereof. The marking (31) is a narrow groove formed by an indentation on an external surface (32) of the second tube (3). An embossing method can be used to form the marking (31) by embossing a graphic marking on the external surface (32) of the second tube (3). The marking (31) is positioned between the two ends of the sighthole (22). Accordingly, the user is able to see the marking (31) through the sighthole (22), and then read the ruler (23) adjacent to the marking (31) to determine the distance between the brake pad of the disc brake device and the brake disc.

The front rod (4) is configured to the rod body at the front end of the second tube (3). The front end of the front rod (4) is positioned exterior of the front end of the first tube (2), and the rear end of the front rod (4) is inserted into the second tube (3) from the front end of the second tube (3). A pivot hole (41) axially penetrates the front rod (4), and a protruding portion (42) protrudes from the front end of the front rod (4). A guide groove (43) is indented in the top edge of the protruding portion (42), and the guide groove (43) affords passage to the pivot hole (41). Two limiting surfaces (44) are formed on two sides of the guide groove (43) at the front end of the protruding portion (42). An abutting portion (45) protrudes from the front end of the protruding portion (42) of the front rod (4). The abutting portion (45) is used to sideward abut against the side surface of a brake disc of a disc brake device (not shown in the drawings). And an abutting surface (46) is further formed on the front end of the abutting portion (45).

The measuring rod (5) is a long round rod, and the measuring rod (5) pivotal penetrates the guide groove (43) and the pivot hole (41) of the front rod (4), as well as the second tube (3) and the first tube (2). The rear end of the measuring rod (5) screws into the screw hole (11) of the base (1), and one end of the retaining screw (14) abuts against and retains one side of the measuring rod (5), thereby enabling the base (1) to connectedly drive the measuring rod (5) and synchronously rotate and effect linear reposition displacement thereof. The front end of the measuring rod (5) extends in a curved sideward direction to form a contact pin (51), which enables the contact pin (51) to be selectively contiguous with any one of the two limiting surfaces (44). The maximum external diameter of the contact pin (51) is less than the distance between the limiting surfaces (44) and the abutting surface (46).

The spring (6) is a helical spring disposed in the interior of the second tube (3). The front end of the spring (6) abuts against the rear end of the front rod (4), and the rear end of the spring (6) abuts against the front end of the base (1). In addition, the measuring rod (5) penetrates the spring (6), and the spring (6) is subjected to corresponding compression from the base (1) and the front rod (4). Accordingly, the elastic force of the spring (6) is used to enable the spring (6) to respectively apply an abutting force on the base (1) and the front rod (4).

As shown in FIG. 1, FIG. 2, FIG. 4, and FIG. 5, on the premise that the wheel has not been detached (not shown in the drawings), when using the aforementioned measuring tool to measure the distance between a brake pad (91) of a disc brake device (9) and a brake disc (92), the user holds the base (1) and moves the measuring tool in the space adjacent to the brake pad (91) toward the brake disc (92) to cause the abutting portion (45) at the front end of the front rod (4) to contact a side (93) of the brake disc (92) using the abutting surface (46). While maintaining contact between the abutting portion (45) and the brake disc (92), the user rotates the base (1), whereupon the spring (6) abuts against and applies an acting force on the front rod (4), which forms stiction between the front rod (4) and the brake disc (92), thereby preventing rotation of the second tube (3) and the front rod (4) when the base (1) is rotated, while enabling the measuring rod (5) to rotate in synchronicity with the rotation of the base (1). And rotation of the measuring rod (5) means the contact pin (51) is not limited by the limiting surfaces (44). The abutting force acting on the base (1) by the spring (6) causes the base (1), the first tube (2), and the measuring rod (5) to displace backward. Accordingly, a corresponding displacement of the second tube (3) relative to the first tube (2) is produced. When the contact pin (51) contacts a surface (94) of the brake pad (91) adjacent to the brake disc (92), the contact pin (51) is blocked by the brake pad (91), whereupon the base (1), the first tube (2), and the measuring rod (5) are stopped from further displacement backward. At which time, the user can read the marking (31) through the sighthole (22) and the corresponding calibration and number adjacent to the ruler (23) indicated by the marking (31), thereby enabling the user to determine the distance between the brake pad (91) and the brake disc (92). The user can then use the distance between the brake pad (91) and the brake disc (92) as a basis to determine the thickness of a friction block (95), and accordingly decide whether or not the brake pad (91) needs to be replaced.

According to what has been described above, the present invention is able to easily and quickly measure the distance between the brake pad (91) and the brake disc (92) without the need to first detach the wheel.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A measuring tool for disc brake device brake pad, in combination, including a base, a first tube, a second tube, a front rod, a measuring rod, and a spring; wherein:
   the base is a round cylindrical body, and a retaining screw is radially screwed into the circumference of the base;
   the first tube is a round tube configured at the front end of the base, and the rear end of the first tube is connected to the front end of the base, a long sighthole is perforated in the tube wall of the first tube, and the two ends of the long sighthole are respectively oriented toward the two ends of the first tube, a ruler is formed at one side of the sighthole on the exterior of the first tube, the ruler is composed of an array of calibrations and numbers, which are used to display length measurements;
   the second tube is a round tube pivoted in the first tube so that the rear end of the second tube is positioned in the interior of the first tube, thereby enabling the first tube to displace back and forth along the axial direction thereof on the exterior of the second tube, a circular marking encircles and is formed on the external circumference of the second tube at a midsection thereof, and the marking is positioned between the two ends of the sighthole;
   the front rod is configured to the rod body at the front end of the second tube, the front end of the front rod is positioned exterior of the front end of the first tube, and the rear end of the front rod is inserted into the second tube, a pivot hole axially penetrates the front rod, and a protruding portion protrudes from the front end of the front rod, a guide groove is indented in the top edge of the protruding portion, and the guide groove affords passage to the pivot hole, two limiting surfaces are formed on the two sides of the guide groove at the front end of the protruding portion, an abutting portion protrudes from the front end of the protruding portion of the front rod, and the abutting portion is used to sideward abut against the side surface of a brake disc of a disc brake device, an abutting surface is further formed on the front end of the abutting portion;
   the measuring rod is a long round rod, and the measuring rod pivotal penetrates the guide groove and the pivot hole of the front rod, as well as the second tube and the first tube, the rear end of the measuring rod is inserted into the center of the front end of the base, and one end of the retaining screw abuts against and retains one side of the measuring rod, thereby enabling the base to connectedly drive the measuring rod and synchronously rotate and effect linear reposition displacement thereof, the front end of the measuring rod extends in a curved sideward direction to form a contact pin, and the contact pin abuts against any one of the two limiting surfaces, the maximum external diameter of the contact pin is less than the distance between the limiting surfaces and the abutting surface;
   the spring is a helical spring disposed in the interior of the second tube, the front end of the spring abuts against the rear end of the front rod, and the rear end of the spring abuts against the front end of the base, in addition, the measuring rod penetrates the spring, and the spring is subjected to corresponding compression from the base and the front rod, accordingly, the spring is able to respectively apply an abutting force on the base and the front rod.

2. The measuring tool for disc brake device brake pad according to claim 1, wherein the marking is a narrow groove formed by an indentation on the external surface of the second tube.

3. The measuring tool for disc brake device brake pad according to claim 1, wherein the periphery close to the front end of the base is indented with an annular inserting groove, an elastic retaining ring is embedded into the inserting groove of the base, the internal tube wall close to the rear end of the first tube is indented with an annular groove, and the annular groove enables the periphery of the retaining ring to embed thereinto, thereby enabling the base to pin connect to the first tube.

4. The measuring tool for disc brake device brake pad according to claim 1, wherein a screw hole is formed in the center of the front end of the base, and the rear end of the measuring rod screws into the screw hole.

* * * * *